US005458087A

United States Patent [19]
Prior et al.

[11] Patent Number: 5,458,087
[45] Date of Patent: Oct. 17, 1995

[54] PET BOWLS WITH CLOSURES TO FACILITATE STORAGE AND TRANSPORTATION THEREOF

[76] Inventors: Diane L. Prior; Albert E. Barber, both of 3074 San Francisco Ave., Long Beach, Calif. 90806

[21] Appl. No.: 236,107

[22] Filed: May 2, 1994

[51] Int. Cl.⁶ .............................. A01K 5/01; A01K 7/00
[52] U.S. Cl. .............................. 119/51.5; 119/61
[58] Field of Search .................... 119/51.5, 61; 220/500, 220/526, 574, 575

[56] References Cited

U.S. PATENT DOCUMENTS

| 2,191,811 | 2/1940 | Trampier, Sr. | 119/51.5 |
| 3,810,446 | 5/1974 | Kightlinger et al. | 119/61 |
| 4,270,490 | 6/1981 | Kopp | 119/61 |
| 4,762,087 | 8/1988 | Henecke | 119/61 |
| 4,800,845 | 1/1989 | Budd | 119/61 |

Primary Examiner—Robert P. Swiatek

[57] ABSTRACT

A pet bowl with closure to facilitate storage and transportation thereof comprising: a pet bowl formed of a rigid plastic material having curved peripheral side walls at its ends and a bottom wall and a central divider panel of a linear construction therebetween to form two separate bowls, one for food and one for water, the side walls including an inverted V-shaped cross-sectional support around the periphery for greater rigidity; and a closure mechanism for sealing the pet bowl for transportation and storage.

3 Claims, 3 Drawing Sheets

FIG. 1
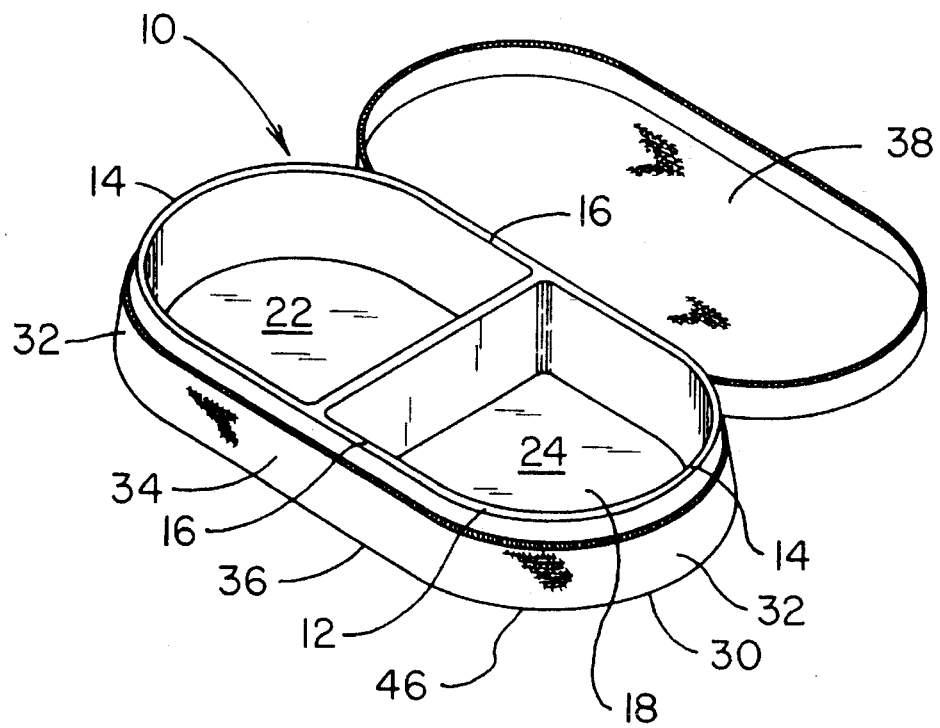
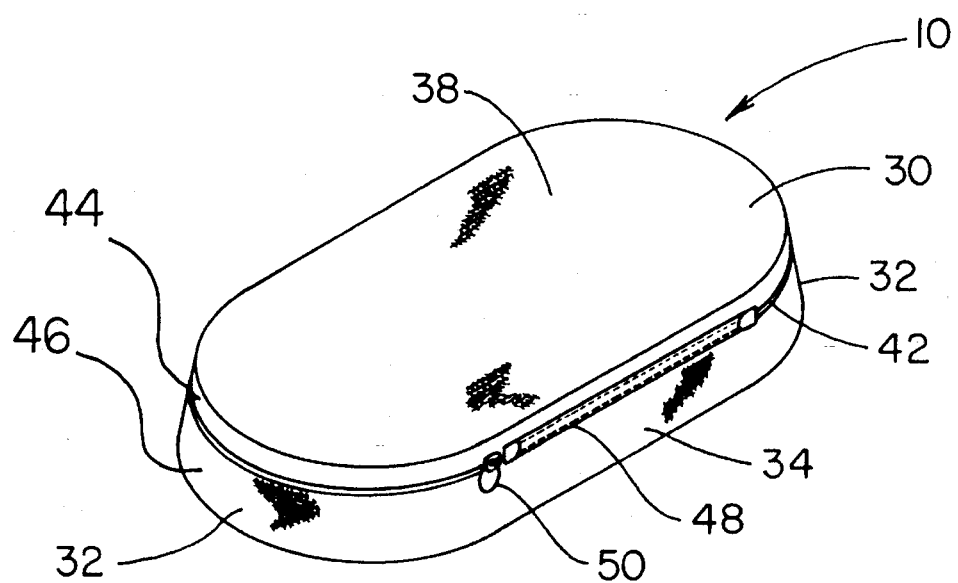
FIG. 2

5,458,087

PET BOWLS WITH CLOSURES TO FACILITATE STORAGE AND TRANSPORTATION THEREOF

BACKGROUND OF THE INVENTION

1. Field of the Invention

The present invention relates to pet bowls with closures to facilitate storage and transportation thereof and more particularly pertains to closing a pet bowl whereby storage and transportation are facilitated.

2. Description of the Prior Art

The use of pet bowls of various designs as well as closure devices for various containers is known in the prior art. More specifically, pet bowls of various designs as well as closure devices for various containers heretofore devised and utilized for the purpose of storing and transporting a wide variety of devices including pet bowls are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,441,003 an animal and pet food bowl.

U.S. Pat. No. 3,611,998 discloses a pet feeding bowl.

U.S. Pat. No. 4,981,108 discloses an animal feeding dish.

U.S. Pat. No. Des. 321,572 discloses the design of a pet food bowl.

U.S. Pat. No. Des. 330,785 discloses the design of a combined pet food bowl and disposable liner.

In this respect, the pet bowls with closures to facilitate storage and transportation thereof according to the present invention substantially departs from the conventional concepts and designs of the prior art, and in doing so provides an apparatus primarily developed for the purpose of closing a pet bowl whereby storage and transportation are facilitated.

Therefore, it can be appreciated that there exists a continuing need for new and improved pet bowls with closures to facilitate storage and transportation thereof which can be used for closing a pet bowl whereby storage and transportation are facilitated. In this regard, the present invention substantially fulfills this need.

SUMMARY OF THE INVENTION

In view of the foregoing disadvantages inherent in the known types of pet bowls of various designs as well as closure devices for various containers now present in the prior art, the present invention provides an improved pet bowls with closures to facilitate storage and transportation thereof. As such, the general purpose of the present invention, which will be described subsequently in greater detail, is to provide a new and improved pet bowls with closures to facilitate storage and transportation thereof and method which has all the advantages of the prior art and none of the disadvantages.

To attain this, the present invention essentially comprises a new and improved pet bowl with closure to facilitate storage and transportation thereof comprising, in combination: a pet bowl formed of a rigid plastic material having curved peripheral side walls at its ends and a bottom wall and a central divider panel of a linear construction therebetween to form two separate bowls, one for food and one for water, the side walls including an inverted V-shaped cross-sectional support around the periphery for greater rigidity; a container formed of a flexible material having curved peripheral side walls, a flat bottom wall, and a flat top wall parallel with the bottom wall, the container being of a size so as to removably receive the bowls, the container being split along a horizontal parting line around the majority of its extent to form an upper portion and lower portion with a hinge therebetween; and a slide fastener removably coupling the upper portion and the lower portion of the container whereby when closed, the slide fastener may seal the container with the pet bowls therein and when opened, the slide fastener will allow the removal of the pet bowl therefrom.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved pet bowls with closures to facilitate storage and transportation thereof which have all the advantages of the prior art pet bowls of various designs as well as closure devices for various containers and none of the disadvantages.

It is another object of the present invention to provide new and improved pet bowls with closures to facilitate storage and transportation thereof which may be easily and efficiently manufactured and marketed.

It is further object of the present invention to provide new and improved pet bowls with closures to facilitate storage and transportation thereof which are of durable and reliable constructions.

An even further object of the present invention is to provide new and improved pet bowls with closures to facilitate storage and transportation thereof which are susceptible of a low cost of manufacture with regard to both materials and labor, and which accordingly are then susceptible of low prices of sale to the consuming public, thereby making such pet bowls with closures to facilitate storage and transportation thereof economically available to the buying public.

Still yet another object of the present invention is to provide new and improved pet bowls with closures to facilitate storage and transportation thereof which provide in the apparatuses and methods of the prior art some of the advantages thereof, while simultaneously overcoming some of the disadvantages normally associated therewith.

Still another object of the present invention is to close a pet bowl whereby storage and transportation are facilitated.

Lastly, it is an object of the present invention to provide new and improved pet bowl with closure to facilitate storage and transportation thereof comprising: a pet bowl formed of a rigid plastic material having curved peripheral side walls at its ends and a bottom wall and a central divider panel of a linear construction therebetween to form two separate bowls, one for food and one for water, the side walls including an inverted V-shaped cross-sectional support around the periphery for greater rigidity; and closure means for sealing the pet bowl for transportation and storage.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of the preferred embodiment of the new and improved pet bowls with closures to facilitate storage and transportation thereof constructed in accordance with the principles of the present invention.

FIG. 2 is a perspective view of the device shown in FIG. 1 but illustrating the closed orientation.

The same reference numerals refer to the same parts through the various Figures.

DESCRIPTION OF THE PREFERRED EMBODIMENT

Figure 3:
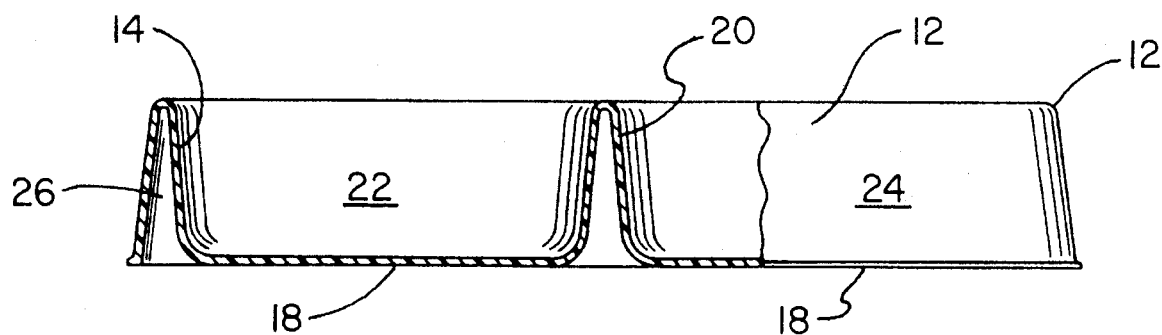
FIG. 3 is a cross-sectional view of the pet bowls of the prior Figures.
Figure 4:
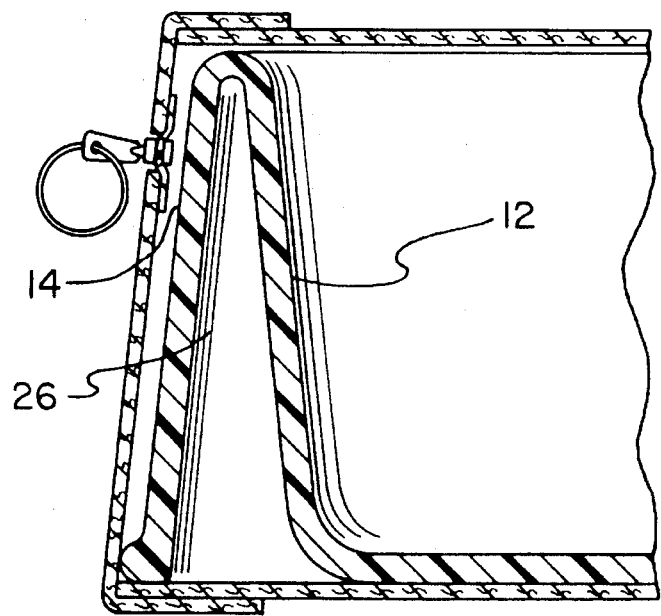
FIG. 4 is an enlarged cross-sectional view of one end of the pet bowl illustrated in the container of FIGS. 1 and 2.

With reference now to the drawings, and in particular to FIG. 1 thereof, the preferred embodiment of the new and improved pet bowls with closures to facilitate storage and transportation thereof embodying the principles and concepts of the present invention and generally designated by the reference numeral 10 will be described.

Specifically, the present invention is comprised of a plurality of components. Such components in their broadest context include a pet bowl and a closure means. The closure means may be a container with a slide fastener or, in the alternative, indentations and a covering plate. Such components are specifically configured and correlated with respect to each other so as to attain the desired objectives.

More specifically, the main component of the system 10 is a pet bowl 12. Such pet bowl is formed of a rigid material, preferably plastic. It has curved peripheral side wall 14 at its ends with linear extents 16 therebetween. The bowl also has a bottom wall 18 and central divider panel 20. The divider panel is of a linear construction between the bowl segments 22 and 24. Two separate bowls are thereby created. One separate bowl is for food and the other is for water. The side walls also include an inverted V-shaped cross-sectional support 26. Such support extends around the periphery of the bowl and provides for greater rigidity of the system.

Next provided is a container 30. Such container is formed of a flexible material, preferably plastic. Such container has curved peripheral side walls 32 with linear side walls 34 therebetween. The container also has a flat bottom wall 36 and a flat top wall 38 parallel with the bottom wall. The container is of a size so as to removably receive the pet bowl.

The container is preferably split along a horizontal parting line 42 around the majority of its extent. This forms an upper portion 44 and a lower portion 46. A hinge 48 is provided therebetween to assist in opening and closing. The last component of the primary embodiment is a slide fastener 50. The slide fastener is for removably coupling the upper portion and the lower portion of the container. When closed, the slide fastener will seal the container with the pet bowls therein. When open, the slide fastener will allow for the removal of the pet bowl therefrom or for the placing of the pet bowl therein.

Figure 5:
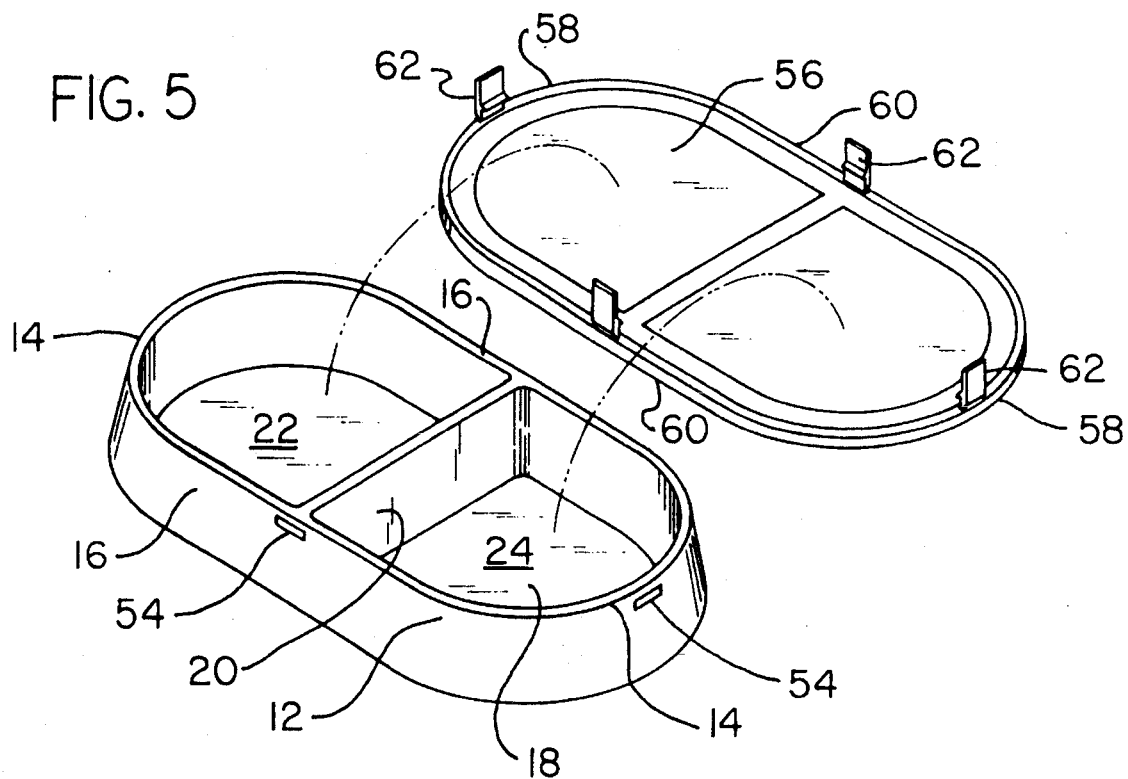
FIG. 5 is an exploded perspective view of an alternate embodiment of the invention.
Figure 6:
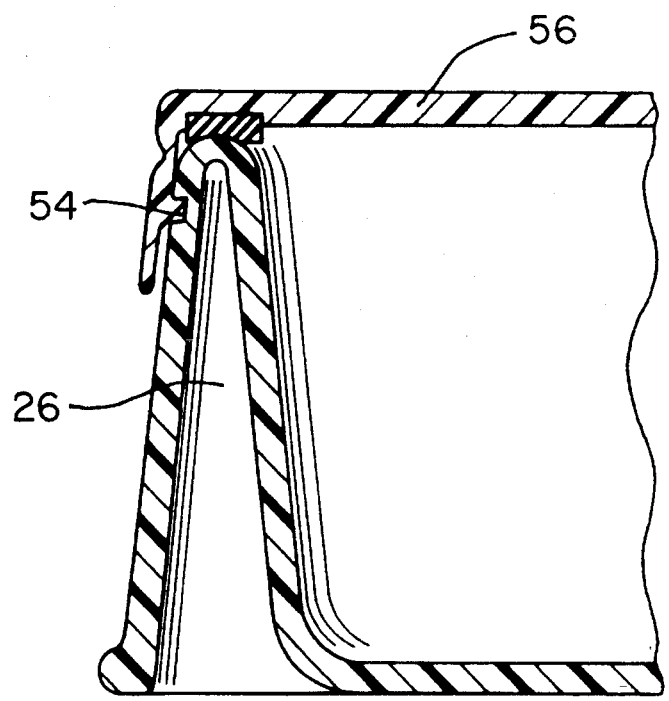
FIG. 6 is a cross-sectional view of the device illustrated in FIG. 5.

An alternate embodiment of the invention is shown in FIGS. 5 and 6. In accordance with such alternate embodiment, the pet bowl 12 is of an essentially identical construction as that of the primary embodiment. In addition, however, a plurality of recesses or indentations 54 are formed. Such indentations are formed in the outer periphery of the side walls of the pet bowl adjacent to the upper edge thereof. For use in association with the pet bowl and indentations, there is also provided a rigid plate 56. Such rigid plate is also preferably fabricated of a rigid plastic. It has a configuration with ovals 58 at its ends with planar extents 60 therebetween. Such plate is positionable over the upper edge of the pet bowl. The rigid plate has a peripheral elastomeric flange 60 recessed therein. Such is for contact with the upper periphery of the bowl for the sealing thereof when in a closed orientation thereover. In order to secure the rigid plate to the bowl, downwardly extending resilient tabs 62 are provided. Such tabs extend downwardly from the plate and are adapted to be removably received into the indentations of the pet bowl. In this manner, the pet bowl may be closed for storage or transportation with the rigid plate locked in position through the tabs and indentations. The rigid plate may also be removed therefrom for use of the bowl by the pet.

The present invention is a compact 5"×5"×2" when folded. Easy storage unfolds to a 10"×2" round bowl. The present invention is convenient when traveling with one's pet.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved pet bowl with closure to facilitate storage and transportation thereof comprising, in combination:

a pet bowl formed of a rigid plastic material having curved peripheral side walls at its ends and a bottom wall and a central divider panel of a linear construction therebetween to form two separate bowls, one for food and one for water, the side walls including an inverted V-shaped cross-sectional support around the periphery for greater rigidity;

a container formed of a flexible material having curved peripheral side walls, a flat bottom wall, and a flat top wall parallel with the bottom wall, the container being of a size so as to removably receive the bowls, the container being split along a horizontal parting line around the majority of its extent to form an upper portion and lower portion with a hinge therebetween; and a slide fastener removably coupling the upper portion and the lower portion of the container whereby when closed, the slide fastener may seal the container with the pet bowls therein and when opened, the slide fastener will allow the removal of the pet bowl therefrom.

2. A new and improved pet bowl with closure to facilitate storage and transportation thereof comprising, in combination:

a pet bowl formed of a rigid plastic material having curved peripheral side walls at its ends and a bottom wall and a central divider panel of a linear construction therebetween to form two separate bowls, one for food and one for water, the separate bowls having a common oval periphery therearound and with the periphery terminated at an upper edge, the side walls including an inverted V-shaped cross-sectional support around the periphery for greater rigidity;

a plurality of indentations formed into the periphery of the side walls remote from the bowls and adjacent to the upper edge thereof; and a rigid plate having an oval configuration at its ends and positionable over the upper edge of the pet bowl, the rigid plate having a peripheral elastomeric flange therein for contact with the upper edge of the bowl for sealing thereof when in a closed orientation thereof and tabs extending downwardly therefrom and removably received at the indentations of the pet bowl for closing the bowl for storage and transportation.

3. A pet bowl with closure to facilitate storage and transportation thereof comprising:

a pet bowl formed of a rigid plastic material having curved peripheral sidewalls at its ends and a bottom wall and a central divider panel of a linear construction therebetween to form two separate bowls, one for food and one for water, the side wall including an inverted V-shaped cross-sectional support around the periphery for greater rigidity;

a container formed of a flexible material having curved peripheral sidewalls, a flat bottom wall and a flat top wall parallel with the bottom wall, the container being of a size so as to removably receive the pet bowl, the container being split along a horizontal parting line around the majority of its extent to form an upper portion and lower portion with a hinge therebetween; and a slide fastener removably coupling the upper portion and the lower portion of the container whereby when closed, the slide fastener may seal the container with the pet bowl therein and when opened, the slide fastener will allow the removal of the pet bowl therefrom.

* * * * *